No. 837,732. PATENTED DEC. 4, 1906.
S. J. RILEY.
FRICTION CLUTCH.
APPLICATION FILED JUNE 20, 1906.

2 SHEETS—SHEET 1.

Witnesses

Inventor
Samuel J. Riley
By W. C. Carman
Attorney

No. 837,732. PATENTED DEC. 4, 1906.
S. J. RILEY.
FRICTION CLUTCH.
APPLICATION FILED JUNE 20, 1906.

2 SHEETS—SHEET 2.

WITNESSES:

INVENTOR
Samuel J. Riley
BY
W. C. Carman
Attorney

UNITED STATES PATENT OFFICE.

SAMUEL J. RILEY, OF YOUNGSTOWN, OHIO.

FRICTION-CLUTCH.

No. 837,732.  Specification of Letters Patent.  Patented Dec. 4, 1906.

Application filed June 20, 1906. Serial No. 322,550.

*To all whom it may concern:*

Be it known that I, SAMUEL J. RILEY, a citizen of the United States, residing at Youngstown, in the county of Mahoning and State of Ohio, have invented certain new and useful Improvements in Friction-Clutches, of which the following is a specification.

This invention relates to friction-clutches of the type usually employed in connection with power-transmitting mechanism for motors and machines generally—such, for instance, as motor-vehicles, hoisting machinery, and driving-gear of various types.

To this end the invention contemplates a friction-clutch of a simple and practical construction and having the parts thereof so related that it will insure a smooth positive action without noise or undue vibration.

A further object of the invention is to provide a friction-clutch construction wherein the working parts are entirely housed and protected against dirt and grit, while at the same time are easily assembled, adjusted, and removed.

Also the invention provides a type of clutch easily applied to a shaft and capable of operating effectually on extremely-low or extremely-high speed shafts. Also the clutch in its action creates no end thrust on the shaft, and while providing a powerful clutching force at the same time will slip if the load exceeds the horse-power of the clutch, thereby avoiding injury to the other parts of the transmitting mechanism or appliances associated therewith.

With these and many other objects in view, which will more readily appear as the nature of the invention is better understood, the same consists in the novel construction, combination, and arrangement of parts hereinafter more fully described, illustrated, and claimed.

The essential features of the invention involved in carrying out the objects above indicated are necessarily susceptible to structural change without departing from the scope thereof; but preferred embodiments of the invention are shown in the accompanying drawings, in which—

Figure 1:
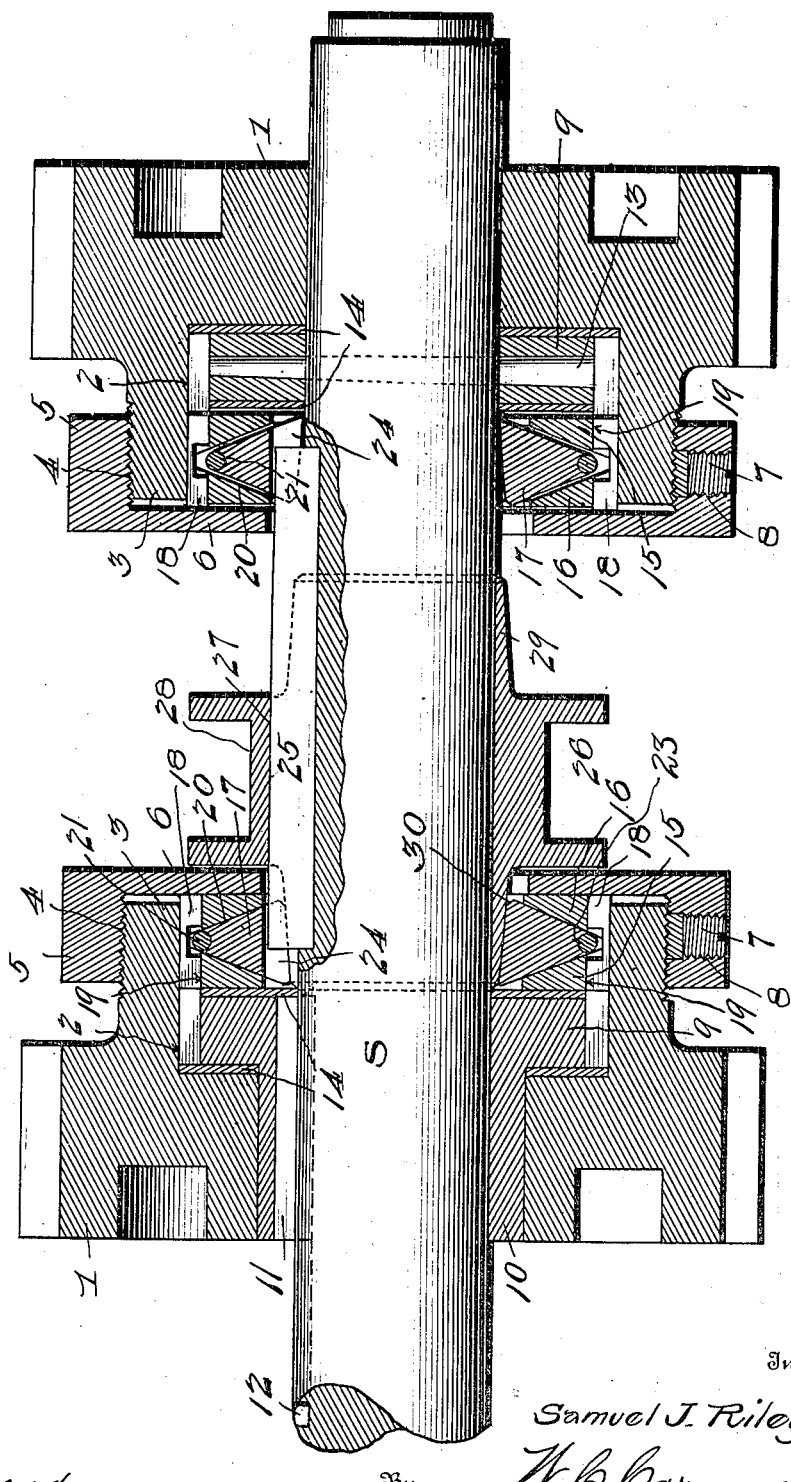
Figure 2:
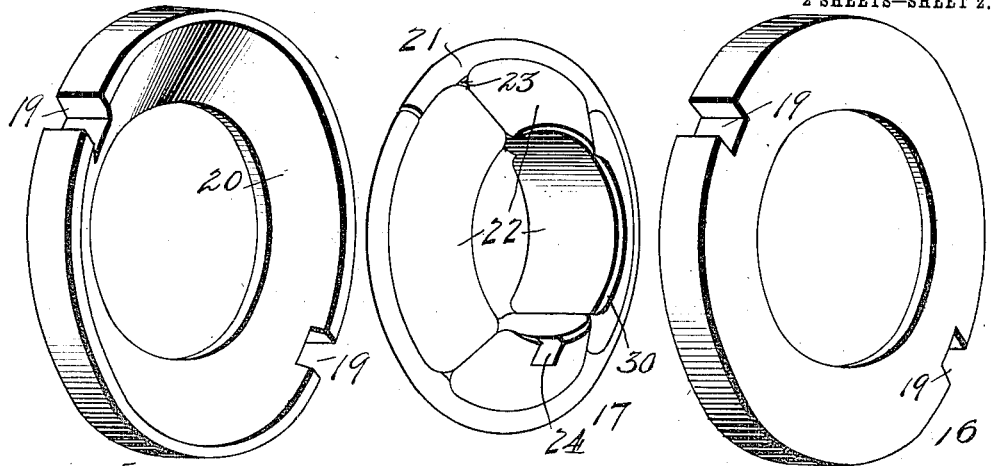
Figure 3:
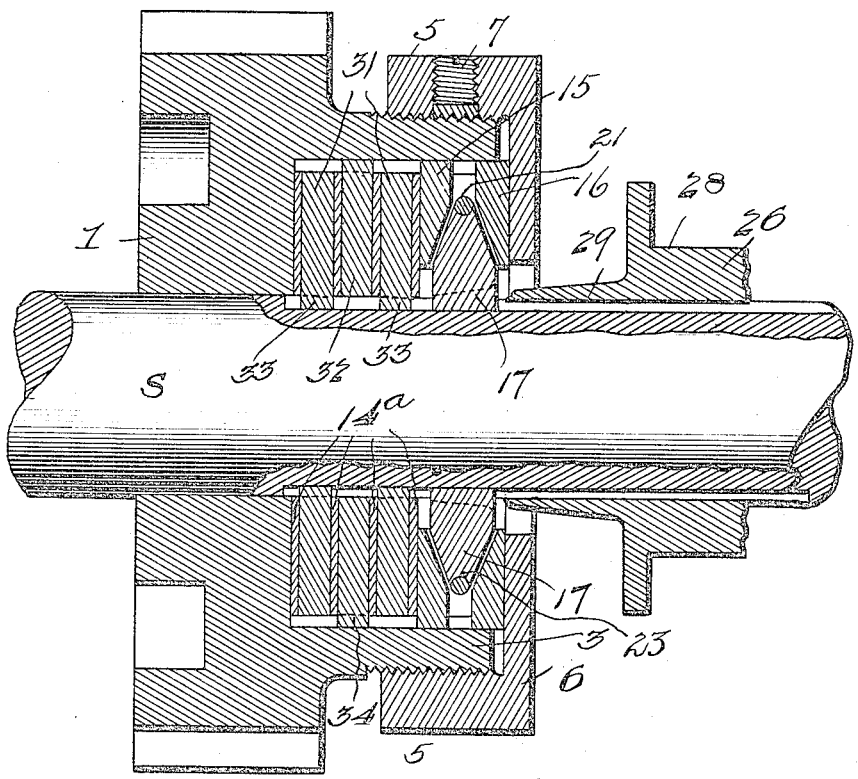

Figure 1 is a longitudinal sectional view of a double-clutch arrangement embodying an improved construction of friction-clutch made in accordance with the present invention. Fig. 2 is an enlarged detail perspective view showing one of the expansible split friction-rings and the pair of friction thrust-collars associated therewith. Fig. 3 is a sectional view of a modified construction designed for a more powerful clutch and embodying interleaved multiple friction-disks for securing a friction-coupling between the driving-shaft and the driven wheel.

Usually the type of clutch covered by the present application is used in pairs for high and low speed transmitting gear such as employed on motor-vehicles and the like; so for illustrative purposes there is shown in Fig. 1 of the drawings a pair of friction-clutches arranged in the spaced relation which they ordinarily occupy upon a common driving-shaft S, so that the said clutches may be alternately brought into play or both left out of action, as may be desired by the operator.

The essential features of each clutch shown in Fig. 1 of the drawings are the same; so a specific description of one will suffice for both, and similar reference characters will apply to the same parts in each of the same clutches.

Referring particularly to the detail construction of the individual clutches shown in Fig. 1 of the drawings, the numeral 1 designates the driven member or wheel, which may be in the form of a pulley or spur-gear, according to the character of transmitting appliances with which it is associated. The present invention contemplates mounting the driven member 1 loosely on the driving-shaft S and to couple it to said shaft for rotation therewith through the medium of friction devices to be presently described. The said driven member 1 is provided at one side thereof with a housing-chamber 2, accommodating therein all of the active friction elements of the clutch, and preferably formed by projecting from one side of said member the laterally-offset casing-neck 3, exteriorly threaded, as at 4, for engagement by the interiorly-threaded flange 5 of the adjusting-cap 6, which constitutes a closure for the outer side of the chamber 2 within the neck 3. It also acts in the capacity of adjusting means for setting up or adjusting the friction elements to a proper working fit. After the flanged adjusting-cap 6 has been properly set the same is fastened or locked in its adjusted position through the medium of a locking-screw or equivalent device 7, mounted in the threaded opening 8 in the flange 5 and binding upon the threaded periphery of the casing-neck 3, as plainly shown in Fig. 1 of the drawings.

As a part of the friction elements of the clutch the latter includes in its general organization a fast friction-shaft collar 9, lying inside of the housing-chamber 2 next to the base of said chamber and designed to be secured fast to the driving-shaft S through any of the ordinary expedients usually employed for that purpose. In one of the clutches shown in Fig. 1 of the drawings the shaft-collar 9 is illustrated as being provided with a quill or sleeve extension 10, forming a bearing for the driven member 1 and receiving the fastening key or feather 11, engaging in the key seat or groove 12, formed in the shaft, and providing an effective form of fastening for securing the collar to the shaft. In the other clutch illustrated in said Fig. 1 of the drawings the shaft-collar 9 is illustrated as being made fast with the driving-shaft by means of a through-pin 13, passing transversely through the shaft and radially through the shaft-collar.

Upon each side of the fast shaft-collar 9 is arranged a fiber or equivalent friction-washer 14, and upon what may be termed the "outer" side of the shaft-collar, between said collar and the body portion of the cap 6, is located the distinctive feature of the present invention. This feature resides in the employment of a pair of spaced friction thrust-collars 15 and 16, made of brass or equivalent material, and an expansible friction-ring 17, interposed between the collars. Both of said collars 15 and 16 are removably keyed or locked to the driven member 1, preferably by locking feathers or keys 18, secured in the inner wall of the casing-neck 3 and engaging in the key-notches 19, formed in the peripheries of the collars 15 and 16 at diagrammatically opposite points. This construction provides for securely coupling the thrust-collars to the driven member so as to turn with such member, while at the same time permitting the collars freedom of movement in a lateral direction to admit of free participation in the frictional clutching action under the actuating influence of the expansible friction-ring 17.

The innermost of the thrust-collars 15 lies next to the outer friction-washer 14 of the shaft-collar, and the outermost thrust-collar 16 lies next to and against the inner side of the flanged adjusting-cap 6. However, both of these collars are of a duplicate construction and are provided in their opposing sides with the dished contact-faces 20, which register and frictionally engage with the inclined sides of the expansible friction-ring 17. The friction-ring 17 is of peculiar construction, the same consisting of a retractile split spring-band 21, preferably made of stout spring-wire, and a circular series of segmental clutch-blocks 22, held inside of the circle of the spring-band. The said blocks 22 are of a triangular or conical shape in cross-section and are provided in their apices with grooves 23, which form a practically continuous seat into which the spring-band 21 is sprung, so as to hold all of the said segmental blocks assembled in ring form and in abutting relation at their ends.

The expansible split friction-ring 17, constructed as above described, is designed to be keyed or feathered to the driving-shaft S, and this is accomplished by providing said ring in one of its segments with a key-groove 24, receiving the main shaft key or feather 25, secured fast in the driving-shaft and disposed longitudinally thereof.

Under normal conditions the expansible friction-ring is contracted and the friction elements are left sufficiently loose so that the driven member or wheel 1 is unclutched or freed from the shaft S, and to engage the clutch or throw the same into gear it is simply necessary to expand the conical friction-ring between the thrust-collars, with the result of thrusting such collars laterally into firm frictional engagement with the fast shaft-collar and with the adjusting-cap 6 of the driven member. This action also necessarily presses the driven member or wheel tightly upon the shaft-collar. The expanding of the friction-ring to accomplish this action is secured through the movement of a shiftable engaging member 26, preferably consisting of a slide-collar mounted upon the shaft and having a keyway 27 taking over the shaft-key 25, which permits the said collar to freely slide lengthwise of the shaft and compels the same to turn with the latter. The said slide-collar has a grooved hub 28, designed to receive the usual shipper-lever, and at each side of said hub the slide collar or member 26 is provided with a tapered wedging-gland 29, adapted to be thrust through the outermost collar 16 and into the friction-ring 17 inside of the circle of segmental clutching-blocks 22. The outer sides of these clutching-blocks are formed with guiding-bevels 30 to facilitate the guiding of the gland 29 within the circle of blocks, so that the radial expansion thereof may be accomplished.

When the wedging-gland 29 is withdrawn from the split friction-ring, the spring-band 21 thereof normally contracts the same, thereby releasing the frictional grip and disengaging the clutch.

By arranging the shiftable engaging member or slide-collar 26 between the paired clutches (shown in Fig. 1 of the drawings) it is readily obvious from such figure of the drawings that the individual clutches may be alternately engaged and disengaged or both allowed to be disengaged at the option of the operator.

Under conditions where it is desirable to provide a clutch having a more powerful clutching action the modification shown in Fig. 3 of the drawings may be resorted to. This modification involves the thought of substituting for the fast shaft-collar 9 a plurality of interleaved friction-disks 31 and 32. Any number of these friction-disks may be employed, according to the power requirements; but with any number of such disks the arrangement would be the same—viz., the alternation of friction-disks secured, respectively, to the driving-shaft S and to the driven member 1. As shown in the drawings, the friction-disks 31 are keyed or splined, as at 33, to the shaft S, and the disk or disks 32 are keyed or splined, as at 34, to the driven member 1, and between the contacting faces of said several interleaved disks are interposed fiber or equivalent construction washers 14ª, similar to those described in connection with Fig. 1 of the drawings. In the modification described the action of the expansible split friction-ring and the thrust-collars operating therewith is the same as already described for the other form of the invention.

From the foregoing it is thought that the construction, action, and many advantages of the herein-described friction-clutch will be readily apparent without further description.

I claim—

1. In a friction-clutch, the combination with a driving-shaft, of a driven member loose on the shaft, thrust-collars interlocked with said driven member, an expansible friction-ring interposed between said thrust-collars and interlocked with the shaft, and an engaging member for expanding said ring.

2. In a friction-clutch, the combination with the driving-shaft, of a driven member having a housing-chamber and an adjustable cap covering said chamber, thrust-collars arranged in said chamber and interlocked with the driven member, a normally contracted expansible friction-ring interposed between said thrust-collars and loosely interlocked with the shaft, and an engaging member for expanding said ring.

3. In a friction-clutch, the combination of the driving-shaft carrying a friction element therewith, a driven member provided with a housing-chamber receiving the said friction element of the shaft, an adjustable cap carried by the driven member and closing the housing-chamber thereof, a pair of friction thrust-collars arranged in the housing-chamber between the friction element of the shaft and said adjusting-cap, said thrust-collars being loosely interlocked with the driven member, an expansible split friction-ring interposed between said thrust-collars and loosely interlocked with the shaft, and an engaging member for expanding said ring.

4. In a friction-clutch, the combination of a shaft carrying therewith a friction element, a driven member having an offstanding casing-neck and a housing-chamber within said neck, a flanged adjusting-cap adjustably mounted on the casing-neck and provided with locking means, a pair of friction thrust-collars arranged in the space between the friction element on the shaft and the said adjusting-cap, said collars being loosely interlocked with the casing-neck, an expansible split friction-ring interposed between said collars and having a wedging engagement therewith, said ring being loosely interlocked with the shaft, and a shiftable engaging member for expanding the ring.

5. In a friction-clutch, the combination of a shaft carrying a friction shaft-collar, a driven member loosely mounted on the shaft and provided with an offstanding casing-neck and a housing-chamber therein, said housing-chamber receiving said shaft-collar, friction-washers arranged on both sides of said collar, a pair of thrust-collars arranged at one side of the shaft-collar and feathered to said casing-neck, said thrust-collars being provided with dished contact-faces, a cross-sectionally-conical expansible friction-ring interposed between the thrust-collars, an adjusting-cap mounted on the casing-neck and arranged over the outermost thrust-collar, and a shiftable engaging member for expanding the friction-ring.

6. In a friction-clutch, the combination of a shaft carrying a fast shaft-collar, a driven member provided with a housing-chamber receiving said collar, an adjusting-cap arranged to cover said chamber, a pair of thrust-collars interposed between the shaft-collar and the adjusting-cap and loosely interlocked with the driven member, said thrust-collars being provided at their opposing sides with dished contact-faces, a cross-sectionally-conical expansible split friction-ring interposed between the thrust-collars, and a shiftable engaging member consisting of a slide-collar slidably mounted on the shaft and provided with a wedging-gland adapted to enter within the center opening of the friction-ring.

7. In a friction-clutch, a driving-shaft, a driven member, thrust-collars arranged within said member and loosely interlocked therewith, an expansible friction-ring interposed between said collars and consisting of a circular series of segmental clutching-blocks and a retractile split spring-band sprung onto and about said blocks, and means for expanding said ring.

8. In a friction-clutch, a shaft, a driven member, thrust-collars loosely interlocked with the driven member and movable against opposing frictional surfaces, said thrust-collars being provided at their opposing sides with inclined contact-faces, an expansible friction-ring splined on the shaft and consisting of a circular series of segmental cross-sectionally-conical clutching-blocks having peripheral seats, and a retractile split spring-band sprung about this series of blocks into the peripheral seats thereof, and means for expanding said ring.

In testimony whereof I hereunto affix my signature in the presence of two witnesses.

SAMUEL J. RILEY.

Witnesses:
J. P. FRANCIS,
J. M. MILLER.